United States Patent [19]

Nakajima et al.

[11] Patent Number: 4,968,425
[45] Date of Patent: Nov. 6, 1990

[54] FILTER OF DEPTH LAYER TYPE

[75] Inventors: Yoshiaki Nakajima, Yono; Tadashi Suzuki, Machida; Yoneji Wada, Urawa, all of Japan

[73] Assignee: Takano Corporation, Japan

[21] Appl. No.: 234,024

[22] Filed: Aug. 18, 1988

[30] Foreign Application Priority Data

Aug. 21, 1987 [JP] Japan ................... 62-206539
Aug. 21, 1987 [JP] Japan ................... 62-206540

[51] Int. Cl.$^5$ ............................................. B01D 29/46
[52] U.S. Cl. ............................ 210/488; 210/497.1; 55/485; 55/489; 55/503; 55/509
[58] Field of Search ................ 55/482, 483, 485, 486, 55/487, 495, 500, 520, 524, 489, 503, 509, 510; 210/249, 235, 483, 486, 488, 489, 490, 493.1, 493.3, 493.4, 497.01, 497.1, 497.2, 497.3, 504, 506, 314, 346, 494.1

[56] References Cited

U.S. PATENT DOCUMENTS

| | | |
|---|---|---|
| 2,201,628 | 5/1940 | McCormick et al. ............ 210/346 |
| 2,604,994 | 7/1952 | Vocelka ............................. 210/346 |
| 2,697,524 | 12/1954 | Foust ................................ 210/346 |
| 2,816,663 | 12/1957 | Kovacs et al. ..................... 210/486 |
| 2,863,561 | 12/1958 | Just et al. ......................... 210/486 |
| 2,902,164 | 9/1959 | Dornauf ............................ 210/486 |
| 3,398,834 | 8/1968 | Nuttall et al. .................... 210/346 |
| 3,537,592 | 11/1970 | Ogden et al. ..................... 210/486 |
| 4,632,755 | 12/1986 | De Graffenreid ................ 210/314 |
| 4,642,182 | 2/1987 | Drori ................................ 210/314 |

Primary Examiner—Richard V. Fisher
Assistant Examiner—Wanda L. Millard
Attorney, Agent, or Firm—Jordan B. Bierman

[57] ABSTRACT

A filter of depth layer type comprises a generally cylindrical filter body formed by laminating filter elements each in the form of a thin sheet of a filtering material having a central hole, and these central holes provide a conduit extending in the axial direction through the filter body. The filter body has a density distribution in which the density is lowest at the outer peripheral area sewing as an inlet for a fluid to be filtered and becomes progressively higher toward the conduit to serving as an outlet for the fluid to be filtered.

9 Claims, 3 Drawing Sheets

FILTER OF DEPTH LAYER TYPE

BACKGROUND OF THE INVENTION

1. Field of the Invention

This invention relates to a filter of depth layer type which can remove impurities from a fluid with very high reliability in spite of a simple structure.

2. Description of the prior Art

A filter body of a filter of depth layer type has such a density distribution that the density is lowest in an area of its inlet side where a fluid such as oil to be filtered flows into the filter, and the density is progressively increased toward an area of its outlet side where the oil flows out from the filter.

Because of such a density distribution, the filter of depth layer type can arrest a large amount of large and small impurities at a low pressure with least possibility of clogging. A filter of so-called roll paper type is known as an example of prior art filters of this kind. In the filter of roll paper type, a filtering material is wound into the form of a roll, and one of the axial ends of the roll is radially most compressed to have a highest density so as to provide a density distribution in which the density progressively decreases from that end toward the other end of the roll. A fluid such as oil is supplied from the large-diameter side toward the small-diameter side of the roll, that is, from the low-density inlet side toward the high-density outlet side of the roll to remove impurities from the oil.

A filter of herringbone twill type for filtering a fluid such as oil is also known as another example of prior art filters of this kind. The filter of twill type includes a filter body made by winding a braid-like filtering material in a twill pattern around a hollow cylindrical core member. The manner of winding is such that the filtering material is initially closely wound under a strong tension on the outer peripheral surface of the core member and is then progressively coarsely wound under a progressively lower tension. That is, the filter body of the filter of twill type has a density distribution in which the density becomes progressively higher radially inward.

However, in the filter of roll paper type described above, creases tend to be produced on the surface of the filter body during compression of the filtering material in the radial direction, and, when these surface creases are produced as a result of strong compression, undesirable paths of oil are formed in the filter body through which oil flows directly without being filtered. Therefore, the filter of roll paper type has had the problem that the desired delicate density distribution cannot be provided in the filter body due to the impossibility of strong compression of the filtering material, and the impurity arresting capability cannot be improved. Also, in the case of the filter of herring bone twill type, the total length of the filtering material wound in the twill pattern around the core member is large, and, in addition, the filtering material must be wound while changing the tension and direction of winding to provide the radial density distribution described above.

Therefore, the filter of twill type has had the problem that the requirement of a great deal of labor and time results in a high cost, and uniformity of the properties of products is difficult to attain.

SUMMARY OF THE INVENTION

It is an object of the present invention to provide a filter of depth layer type which can perfectly remove impurities from a fluid such as oil in spite of a simple structure and which solves all of the prior art problems described above.

In accordance with the present invention, there is provided a filter of depth layer type comprising a generally cylindrical filter body formed by laminating a plurality of filter elements each in the form of a thin sheet of a filtering material having a central hole, the holes providing a continuous conduit extending in the axial direction through the filter body when the filter elements are laminated, the filter body having a density distribution in which the density is lowest at the outer peripheral are a serving as an inlet for a fluid to be filtered and becomes progressively higher toward the conduit serving as an outlet for the fluid to be filtered.

DESCRIPTION OF THE PREFERRED EMBODIMENTS

Preferred embodiments of the filter of depth layer type according to the present invention will now be described in detail with reference to the drawings.

Figure 1:
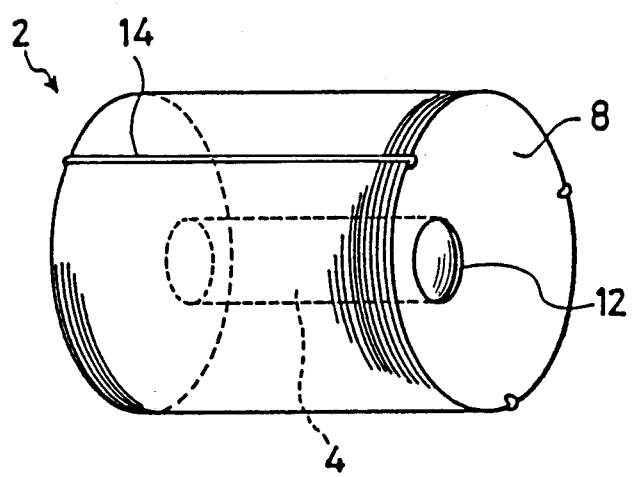
FIG. 1 is a perspective view of an embodiment of the filter of depth layer type according to the present invention.
Figure 2:
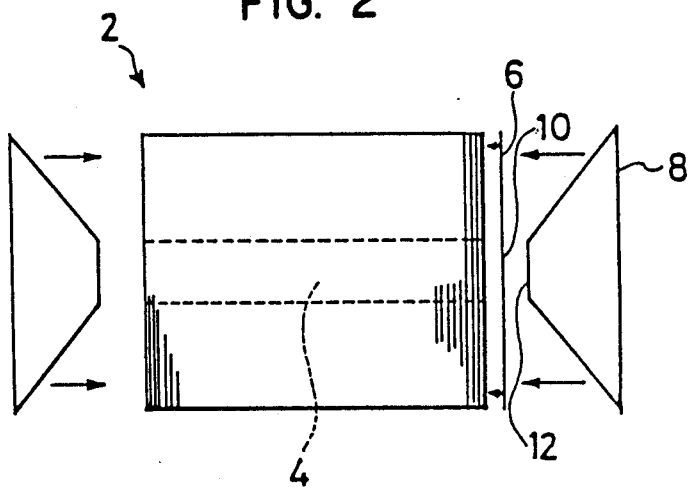
FIG. 2 is an exploded side elevation view of the filter shown in FIG. 1.

FIG. 1 shows an embodiment of the filter of depth layer type according to the present invention. Referring to FIG. 1 the filter includes a filter body 2 which is cylindrical in shape and formed by lamination many filter elements 6. As shown in FIG. 2, the filter elements 6 are each in the form of a disc having a central hole 10, and a pair of holding plates 8 are mounted on both ends respectively of the laminate consisting of the filter elements 6. When the filter elements 6 are laminated, their central holes 10 are continuously aligned to define a through-hole 4 or conduit extending through the center of the filter body 2 as shown in FIG. 1. Each of the holding plates 8 is in the form of a frusto-conical disc having an opening 12 at the top of the frustum, and these holding plates 8 are mounted in such a relation that the tops of the frusto-conical discs confront each other. The holding plates 8 are retained in position by a pressure of fixtures 14 to inpart a holding pressure to the laminated filter elements 6. The value of this holding pressure is merely such that the holding plates 8 engage at least at their outer peripheral edges with the outermost filter elements 6.

In operation, a fluid such as oil to be filtered flows into the filter body 2 from the outer peripheral surface of the filter body 2 and flows out from the central conduit 4 of the filter body 2. Because the frusto-conical holding plates 8 are mounted on both ends respectively of the filter body 2 as described already, the radially inner portions of the filter elements 6 are more strongly compressed then the radially outer portions and have a density higher than that of the latter. That is, the density distribution in the laminated filter elements 6 conforms to the frusto-conical shape of the holding plates 8. Therefore, relatively large impurities contained in the oil are arrested in the radially outer portion of the filter body 2, and relatively small impurities are arrested in the radially inner filter-body portion where the density of the filter elements 6 is high. Thus, the filter of depth layer type of the present invention exhibits a high capability of arresting impurities with least possibility of clogging.

Figure 3:
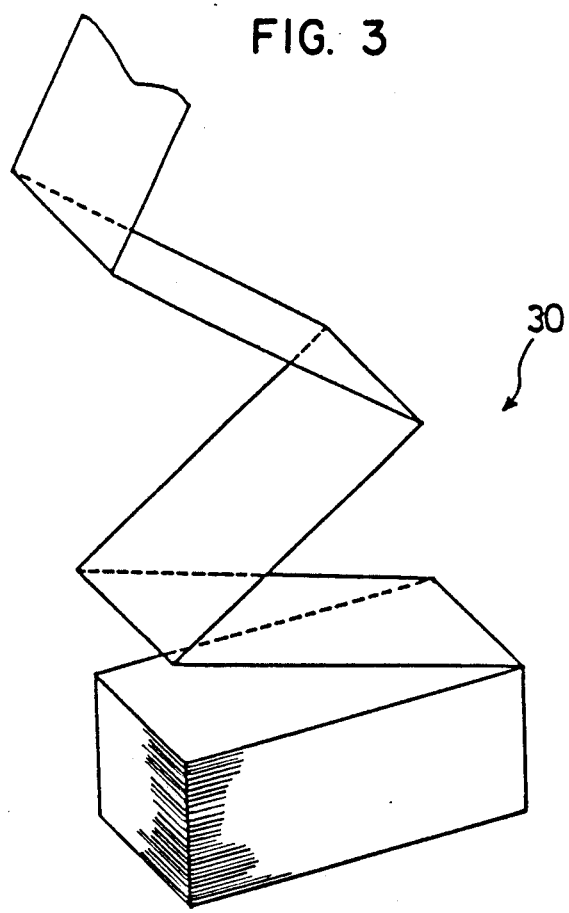
FIG. 3 is a perspective view of another form of the filter elements.

The filter elements 6 employed in the aforementioned embodiment are circular in shape. However, as shown in FIG. 3, an elongate web of filtering material may be successively folded to provide a laminate 30 of filter elements. The laminate 30 formed in this manner has a shape similar to a prism. Such a laminate 30 may be directly used as a filter body, or its cornets may be cut away to provide a cylindrical filter body as described with reference to FIGS. 1 and 2.

In the aforementioned embodiment, the holding plates 8 having a frusto-conical shape are employed by way of example. However, it is apparent that the holding plates 8 in the present invention are in no way limited to such a specific shape, and those having a pyramidal shape or a stepwise inclining shape may also be employed. Further, it is apparent that the taper of the holding plates 8 and the degree of pressurization by the holding plates 8 may be suitably changed as required. Furthermore, the holding plates 8 having the frusto-conical shape need not be provided on both sides, and one of them may be replaced by a flat plate.

Figure 4:
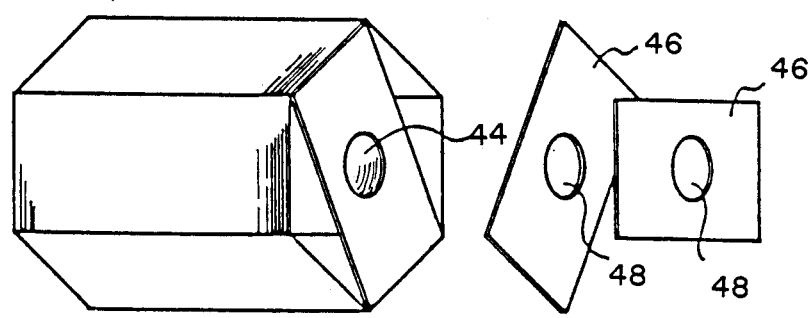
FIG. 4 is a perspective view of another embodiment of the filter of depth layer type according to the present invention.

Another embodiment of the filter of depth layer type according to the present invention will be described with reference to FIGS. 4 to 6. Referring to FIG. 4, the filter includes a filter body 42 which is in the form of a hexagonal prism in its overall shape and has a central through-hole or conduit 44. This filter body 42 is formed by alternately laminating many filter elements 46 in three different directions, that is, at an angle of 120° therebetween to constitute the shape of the hexagonal prism. Each of the filter elements 46 is in the form of a rectangular sheet of a filtering material such as paper or nonwoven cloth and has a central circular hole 48. The ratio between the short and long sides of the rectangular sheet is preferably $1:\sqrt{3}$. These filter elements 46 are laminated so as to form a hexagonal external shape as described above and so that their circular holes 48 are continuously aligned to define the conduit 44 extending through the center of the filter body 42.

Figure 5:
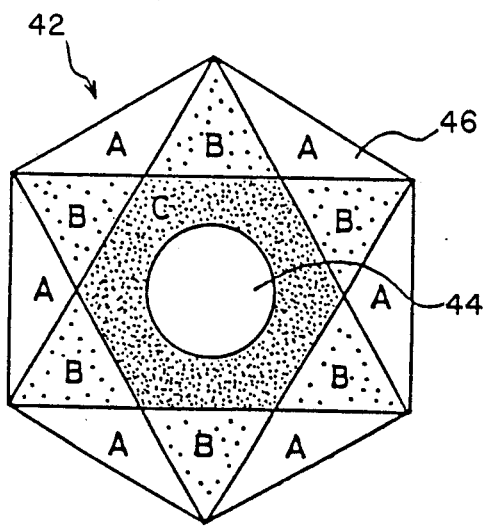
FIG. 5 is front elevation view of the filter shown in FIG. 4.
Figure 6:
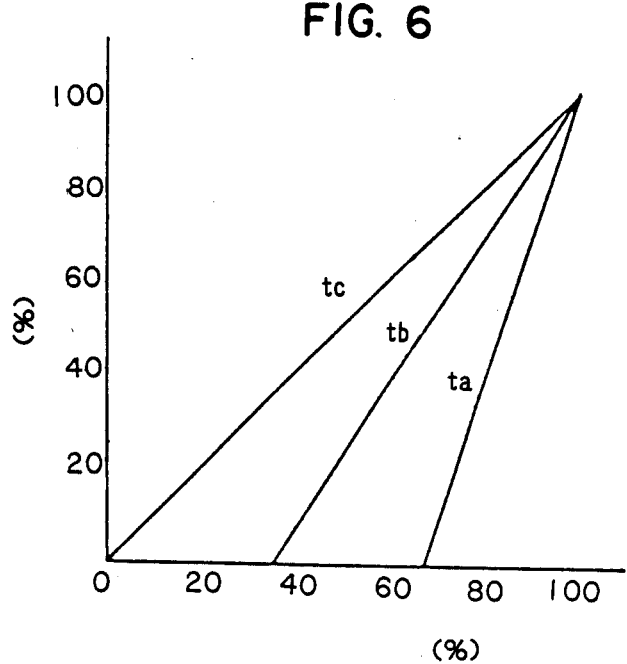
FIG. 6 is a graph showing the relation between the degree of pressurization and the degree of compression in the filter shown in FIG. 4.

In the filter body 42 constituted in the manner described above, all the filter elements 46 are superposed in an area C around the conduit 44, $\frac{2}{3}$ of the filter elements 46 are superposed in areas B, and $\frac{1}{3}$ of the filter elements 46 are superposed in areas A, as shown in FIG. 5. Therefore, this filter body 42 has the function of depth layer filtration in that the filter density is low in its outer peripheral portion and progressively increases toward the center of the filter body 42. Thus, when a flows such as oil to be filtered flows into the filter body 42 from the outer peripheral surface of the filter body 42 and flows out from the central conduit 44 of the filter body 42, relatively large impurities are arrested in the outer peripheral filter-body portion, and relatively small impurities are arrested in the outer peripheral filter-body portion, and relatively small impurities are arrested in the central filter-body portion. Therefore, impurities including those of very small sizes can be efficiently arrested.

This filter body 42 may be suitably compressed in the direction of lamination. When the filter body 42 is thus compressed in the direction of lamination, the superposed states of the portions of the filter elements 46 in the areas A, B and C are changed to change the distances between the portions of the filter elements 46 in the individual areas. Suppose that the filter 42 body a has a total length $L_1$ before pressurization, and this total length $L_1$ is reduced to a length $L_2$ after pressurization. In this case, the degree of pressurization is expressed as $(L_1-L_2)/L_1 \times 100$, and the relation between the degree of pressurization and the degree of compression is as shown in FIG. 6. It will be seen in FIG. 6 that the filter element portions in the area C are compressed in proportion to the degree of pressurization of all the filter elements 46 as shown by a curve $t_c$. It will also be seen that the filter element portions in the areas B start to be compressed after the degree of pressurization of all the filter elements 46 exceeds about 30% as shown by a curve $t_b$, and the filter element portions in the areas A start to be compressed after the degree of pressurization of all the filter elements 46 exceeds about 60% as shown by a curve $t_a$. Thus, the states of compression of the portions of the filter elements 46 in the areas A, B and C can be suitably changed. In this case, holding plates are disposed at both ends respectively of the filter body 42, and, after the step of predetermined pressurization as described above, the holding plates are fixed in position by suitable fixing means.

The aforementioned second embodiment has referred to employment of filter body in the form of a hexagonal prism. However, it is apparent that the present invention is it no way limited to a filter body of such a specific shape, and the shape and directions of lamination of the filter elements 46 may be suitably modified to provide filter bodies of any other shapes including an octagonal prism.

We claim:

1. A depth layer filter comprising an axially compressed filter body comprising a lamination of a plurality of filter members which are thin sheets of compressible filter material having central holes, said central holes defining a continuous conduit extending axially through said filter body, said filter body being compressed so that the density thereof is lowest at or adjacent to an outer peripheral are which serves as an inlet for fluid to be filtered, and become progressively higher radially inward toward said conduit which serves as an outlet for said fluid.

2. The filter of claim 1 wherein said lamination is axial, there-being holding plates at both ends of said filter body pressed against said ends at a predetermined pressure, at least one of said holding plates having a shape projecting toward said conduit.

3. The filter of claim 2 wherein at least one of said holding plates has a frustoconical shape.

4. The filter of claim 2 wherein at least one of said holding plates has a stepwise inclined shape.

5. The filter of claim 2 wherein at least one of said holding plates has a pyramidal shape.

6. The filter of claim 1 wherein radially central portions of said filter members are superposed in the central area of said filter body and have a highest density, and said density becomes progressively lower toward said outer peripheral portions of said filter elements superposed in the outer peripheral area of said filter body.

7. The filter of claim 6 wherein said filter members are each a rectangular sheet of a filtering material and are laminated at a predetermined angle therebetween at the central area of said filter body.

8. The filter of claim 7 wherein each said rectangular sheet has a ratio of $1:\sqrt{3}$ between its short and long sides and said angle is 120°.

9. The filter of claim 1 wherein said filter body is generally cylindrical.

* * * * *